United States Patent
Kim

(10) Patent No.: US 9,857,506 B2
(45) Date of Patent: Jan. 2, 2018

(54) WINDOW MEMBER, DISPLAY DEVICE HAVING THE SAME, AND METHOD OF MANUFACTURING THE DISPLAY DEVICE

(71) Applicant: SAMSUNG DISPLAY CO., LTD., Yongin, Gyeonggi-Do (KR)

(72) Inventor: Kyung-Man Kim, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/237,472

(22) Filed: Aug. 15, 2016

(65) Prior Publication Data
US 2017/0146698 A1 May 25, 2017

(30) Foreign Application Priority Data
Nov. 20, 2015 (KR) .................. 10-2015-0163498

(51) Int. Cl.
| | |
|---|---|
| *G02B 9/08* | (2006.01) |
| *G02B 3/00* | (2006.01) |
| *B29C 65/48* | (2006.01) |
| *B29L 31/34* | (2006.01) |
| *G06F 3/041* | (2006.01) |

(52) U.S. Cl.
CPC ............ *G02B 3/0006* (2013.01); *B29C 65/48* (2013.01); *B29L 2031/3475* (2013.01); *G06F 3/041* (2013.01); *G06F 2203/04103* (2013.01)

(58) Field of Classification Search
CPC ................. G02B 3/0006; B29C 65/48; B29L 2031/3475; G06F 3/041; G06F 2203/04103

USPC .................................................. 359/738–740
See application file for complete search history.

(56) References Cited

U.S. PATENT DOCUMENTS

2015/0370395 A1* 12/2015 Hsu .................. G06F 3/0412
345/174

FOREIGN PATENT DOCUMENTS

| KR | 10-1380802 | 4/2014 |
|---|---|---|
| KR | 10-2014-0071093 | 6/2014 |
| KR | 10-1501427 | 3/2015 |
| KR | 10-1512185 | 4/2015 |
| KR | 10-1526109 | 6/2015 |
| WO | WO 2015/088088 A1 | 6/2015 |

* cited by examiner

*Primary Examiner* — William Choi
(74) *Attorney, Agent, or Firm* — Lewis Roca Rothgerber Christie LLP

(57) ABSTRACT

A window member includes a first member and a second member, and is divided into a transmission area and a light blocking area. The first member includes a first base member, and a first decoration member on a portion of a surface of the first base member. The second member includes a second base member, and a second decoration member on a portion of a surface of the second base member configured to define a boundary line between the transmission area and the light blocking area. The second base member includes a first area on which the second decoration member is disposed and corresponding to a portion of the light blocking area; a second area corresponding to the transmission area, and a third area corresponding to the remaining portion of the light blocking area. The first decoration member overlaps with the third area and partially overlaps with the first area.

20 Claims, 9 Drawing Sheets

WINDOW MEMBER, DISPLAY DEVICE HAVING THE SAME, AND METHOD OF MANUFACTURING THE DISPLAY DEVICE

CROSS-REFERENCE TO RELATED APPLICATIONS

This application claims priority to and the benefit of Korean Patent Application No. 10-2015-0163498, filed on Nov. 20, 2015, in the Korean Intellectual Property Office, the entire content of which is incorporated herein by reference.

BACKGROUND

1. Field

The present disclosure herein relates to a window member, a display device having the window member, and a method of manufacturing the display device.

2. Description of the Related Art

Various display devices used in televisions, mobile phones, navigation systems, computer monitors, and game consoles are being developed. The display devices provide an image having prescribed information to a user. The display devices include, on the front surface, an area that displays the image (a display area), and an area that does not display the image (a non-display area). The non-display area is perceived by the user as a border having a particular color.

The border of the display device is formed by directly printing an ink layer on a surface of tempered glass or reinforced plastic (hereinafter, a printing method), or by attaching a film, on which an ink layer is disposed, on a surface of tempered glass or reinforced plastic (hereinafter, a lamination method).

Compared to the lamination method, it is difficult in the case of the printing method for the border to have a variety of colors, due to the respective surface properties of tempered glass and reinforced plastic. In the case of the lamination method, because there is an additional process of cutting the film and an additional process of attaching the film when compared to the printing method, errors in the manufacturing process may be consequently generated.

SUMMARY

An aspect of embodiments of the present disclosure is directed toward a display device having a window member that reduces the tolerance for errors (e.g., reduces errors) which may occur in a manufacturing process.

Another aspect of embodiments of the present disclosure is directed toward a method of manufacturing the display device.

According to an embodiment of the inventive concept, a display device includes a display panel and a window member. The display panel displays an image. The window member includes a transmission area that transmits the image and a light blocking area that is adjacent to the transmission area and blocks the image.

In an embodiment, the window member may include a first member and a second member. The first member may include a first base member having a top surface and a bottom surface facing away from the top surface, and a first decoration member on a portion of the bottom surface of the first base member. The second member may be on the top surface of the first base member. The second member includes a second base member having a top surface and a bottom surface facing away from the top surface, and a second decoration member on a portion of the bottom surface of the second base member. The second decoration member is configured to define a boundary line between the transmission area and the light blocking area.

In an embodiment, the second base member may include a first area, a second area, and a third area. The first area may correspond to a portion of the light blocking area, and the second decoration member may be disposed thereon. The second area may be adjacent to the first area and correspond to the transmission area. The third area may be adjacent to the first area and correspond to a remaining portion of the light blocking area.

In an embodiment, the first decoration member may overlap the third area and also partially overlap the first area.

In an embodiment, the first base member may be a plastic film.

In an embodiment, the first decoration member may include an optical pattern layer, a deposition layer, and an ink layer. The optical pattern layer may be on the first base member and have a lenticular pattern. The deposition layer may be on the optical pattern layer and includes an inorganic oxide and/or a metal. The ink layer may be on the deposition layer.

In an embodiment, the inorganic oxide may include titanium dioxide ($TiO_2$) and/or silicon dioxide ($SiO_2$). In an embodiment, the metal may include indium (In).

In an embodiment, a color of the ink layer may be black or white.

In an embodiment, the second base member may be a tempered glass or a reinforced plastic.

In an embodiment, the second decoration member may include a pigment and/or a dye.

In an embodiment, a width of the second decoration member may be about 0.1 mm to about 0.6 mm, and a thickness of the second decoration member may be about 1 μm to about 6 μm.

In an embodiment, the window member may further include an adhesive member between the first member and the second member. The first member and the second member may be coupled by the adhesive member.

In an embodiment, the display device may further include a touch sensing member between the display panel and the window member.

In an embodiment, the display device may further include a protective member that is coupled to the window member and configured to accommodate the display panel and the touch sensing member.

According to an embodiment of the inventive concept, a method of manufacturing a display device is provided. The method includes manufacturing a window member including a transmission area and a light blocking area adjacent to the transmission area, and coupling a display panel to the window member. In the manufacturing of the window member, the window member (that has a transmission area and a light blocking area adjacent to the transmission area) is manufactured. In the coupling of the display panel, the display panel is coupled to the window member.

In an embodiment, the manufacturing of the window member may include manufacturing a first member, manufacturing a second member, and attaching the first member with the second member. In the manufacturing of the first member, a first decoration member is disposed on a portion of a first base member that corresponds to the light blocking area, which is a plastic film. In the manufacturing of the second member, a second decoration member is disposed on a portion of a second base member, which is a tempered glass or a reinforced plastic, to define a boundary line between the transmission area and the light blocking area. In the attaching of the first member with the second member, the first member and the second member are coupled utilizing an adhesive such that the first decoration member and the second decoration member partially overlap.

In an embodiment, the manufacturing of the first member may include preparing an optical pattern layer, depositing a deposition layer, and printing an ink layer. In the preparing of the optical pattern layer, the optical pattern having a lenticular pattern may be disposed on the first base member. In the depositing of the deposition layer, the deposition layer (including an inorganic oxide and/or a metal) may be disposed on the optical pattern layer. In the printing of the ink layer, the ink layer may be disposed on the deposition layer.

In an embodiment, the coupling of the display panel may include aligning the display panel and the window member with respect to the second decoration member.

DETAILED DESCRIPTION

Figure 1:
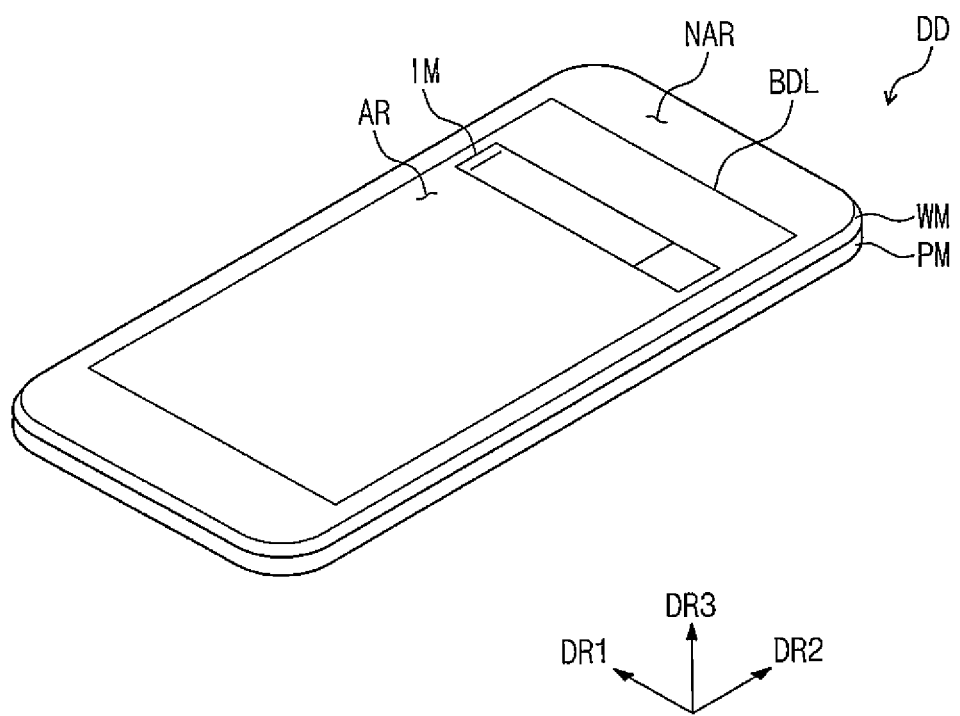
FIG. 1 is a perspective view of a display device according to an embodiment of the inventive concept.

The embodiments of the present invention may be variously modified and have multiple forms. Thus, specific embodiments are exemplarily illustrated in the drawings and described in more detail in this specification. However, this is not intended to limit the scope of the present invention to the specific disclosed forms; rather, it should be understood that all variations, equivalents or substitutes within the concept and technical scope of the present invention are also included.

Hereinafter, one or more embodiments of the present invention will be explained in more detail with reference to the accompanying drawings. In describing the embodiments of the present invention, the respective dimensions (length, width, thickness, and/or the like) of the elements may be expanded (e.g., exaggerated) or reduced for clarity of illustration. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration. As used herein, the term "about," and similar terms are used as terms of approximation and not as terms of degree, and are intended to account for the inherent deviations in measured or calculated values that would be recognized by those of ordinary skill in the art. Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Figure 2:
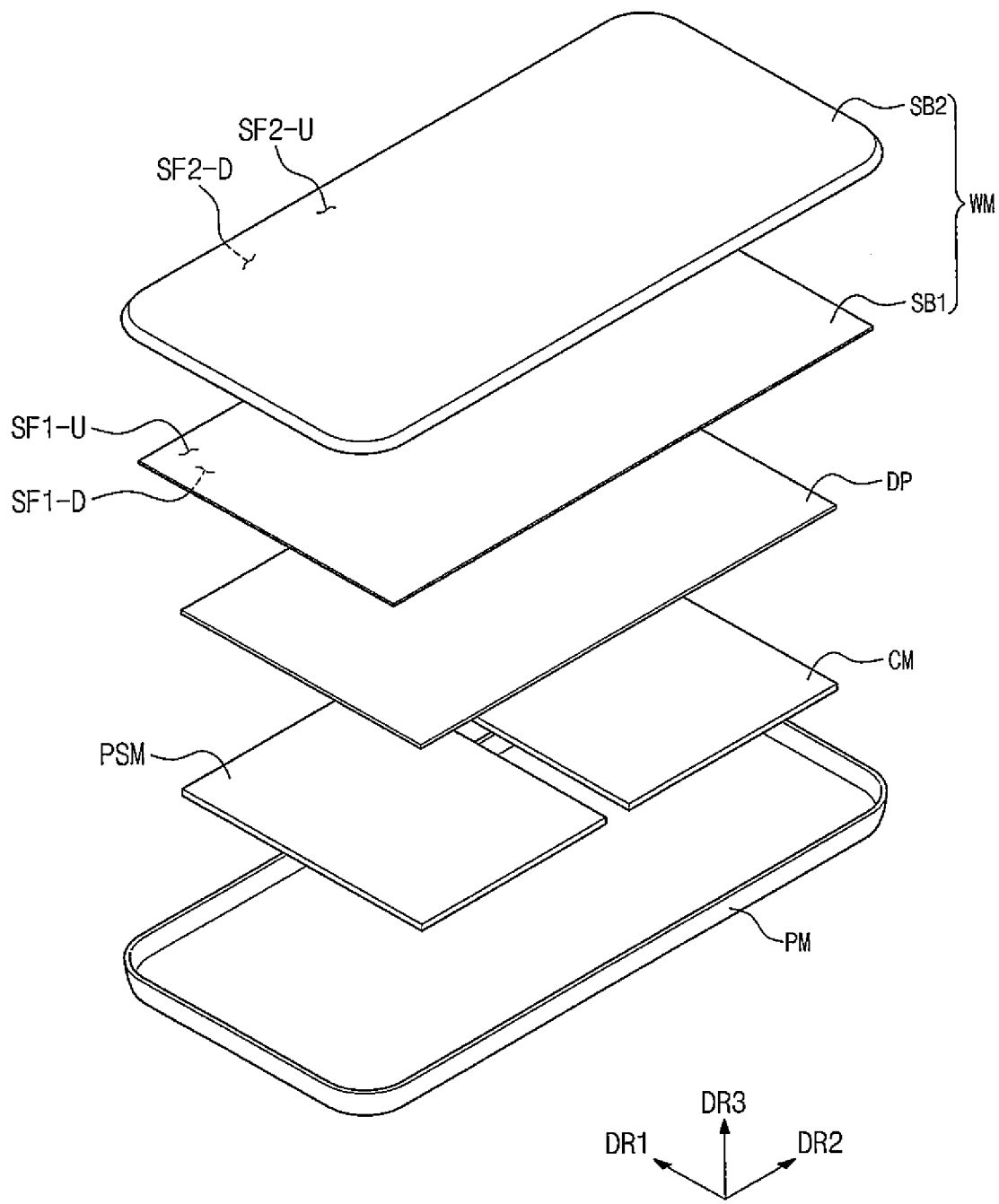
FIG. 2 is an exploded perspective view of the display device illustrated in FIG. 1.
Figure 3:
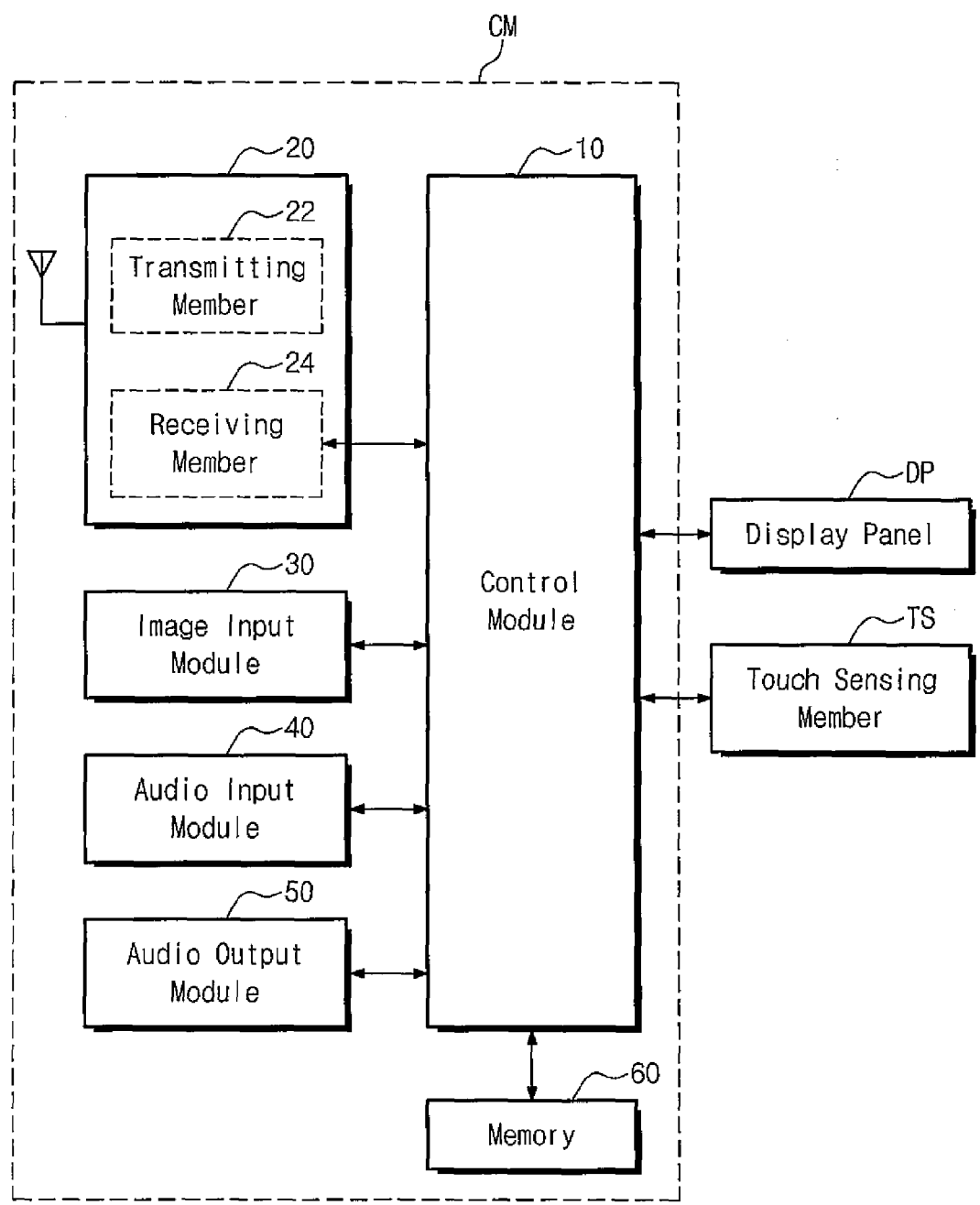
FIG. 3 is a block diagram of the display device illustrated in FIG. 1.

FIG. 1 is a perspective view of a display device DD according to an embodiment of the inventive concept. FIG. 2 is an exploded perspective view of the display device DD illustrated in FIG. 1. FIG. 3 is a block diagram of the display device DD illustrated in FIG. 1. A mobile phone is exemplarily illustrated in FIGS. 1 to 3, but the display device according to an embodiment of the inventive concept is not limited thereto, and may be realized by being modified into various information providing devices such as a television, a navigation system, a computer monitor, a game console, and/or the like.

As illustrated in FIG. 1, the display device DD includes a plurality of areas that are divided (e.g., separately arranged) on the front surface. The front surface of the display device DD is the surface on which an image IM is displayed, and may be defined by a first direction DR1 and a second direction DR2 that cross (e.g., are perpendicular to) each other.

The display device includes a transmission area (or display area) AR, and a light blocking area (or non-display area) NAR adjacent to the transmission area AR. In FIG. 1, the image IM is exemplarily illustrated as an Internet search window. The light blocking area NAR provides a decoration pattern on the front surface. The decoration pattern may be a pattern composed of (e.g., including) a single color or a pattern in which a plurality of colors are mixed.

For example, the transmission area AR may have a rectangular shape. The light blocking area NAR surrounds the transmission area AR. In other words, the light blocking area NAR forms the border of the front surface. Meanwhile, in the present embodiment, the shape of the light blocking area NAR may be modified. The light blocking area NAR may not form a border, and portions of the light blocking area NAR facing the first direction DR1 (e.g., portions of the light blocking area NAR adjacent to the two long sides of the transmission area AR) in FIG. 1 may be excluded (e.g., may not be included).

As illustrated in FIG. 2, the display device according to an embodiment of the inventive concept includes a window member WM, a display panel DP, a power source member PSM, a circuit member CM, and a protective member PM. The window member WM and the display panel DP may be laminated in a third direction DR3 that is perpendicular to the first direction DR1 and the second direction DR2. In FIG. 2, an adhesive member is not shown. For example, an optical clear adhesive OCA may be disposed between the window member WM and the display panel DP.

The window member WM includes a first member SB1 and a second member SB2. The first member SB1 includes a top surface (hereinafter, a first top surface) SF1-U and a bottom surface (hereinafter, a first bottom surface) SF1-D that are disposed to face away from each other in the third direction DR3. The second member SB2 includes a top surface (hereinafter, a second top surface) SF2-U and a bottom surface (hereinafter, a second bottom surface) SF2-D that are disposed to face away from each other in the third direction (axis) DR3. The window member WM includes a transparent portion through which the image IM provided from the display panel DP is able to pass through, and this portion corresponds to the transmission area AR.

Referring to FIGS. 2 and 3, a touch sensing member (or touch screen) TS may be disposed between the display panel DP and the window member WM. The touch sensing member TS calculates the coordinate information of an external input. Here, the external input may refer to input through a stylus pen, a user's finger, and/or the like. The external input is actually generated on the window member WM. A resistive touch panel, a capacitive touch panel, an electromagnetic induction touch panel, and/or the like, may be utilized as the touch sensing member TS.

The touch sensing member TS includes at least one of a substrate, a resistive layer, and a plurality of conductive layers. The touch sensing member TS and the display panel DP that are manufactured through separate processes may be coupled through an optically transparent adhesive layer. In an embodiment of the inventive concept, the touch sensing member TS may be formed directly on the display panel DP. For example, one of the plurality of conductive layers (of the touch sensing member TS) may be disposed directly on a surface of the display panel DP (the top surface of the display panel DP in FIG. 2). Moreover, in an embodiment of the inventive concept, the touch sensing member TS may also be excluded.

The display panel DP generates the image IM. The display panel DP is not particularly limited, and, for example, an organic light emitting display panel, a liquid crystal display panel, a plasma display panel, an electrophoretic display panel, an electrowetting display panel, and/or the like, may be utilized.

The protective member PM houses (accommodates) the display panel DP, the touch sensing member TS, the power source member PSM, and the circuit member CM. The protective member PM may be coupled to the window member WM. FIG. 2 exemplarily illustrates the protective member PM that is composed of (e.g., includes) a single member. The protective member PM may include two or more parts that are coupled to each other.

The power source member PSM provides the power source needed to drive the display device. The power source member PSM may provide a driving voltage to the display panel DP and the touch sensing member TS. The circuit member CM includes a circuit board and electronic modules connected to the circuit board. The circuit board includes a plurality of resistive layers and a plurality of wiring layers. A portion of the electronic modules may be installed on the circuit board, and the remaining portion may be connected to the circuit board through a flexible circuit board.

Detailed description of the electronic modules is given with reference to FIG. 3. As illustrated in FIG. 3, the electronic modules may include a control module 10, a wireless communication module 20, an image input module 30, an audio input module 40, an audio output module 50, a memory 60, and/or the like.

The control module 10 controls the overall operation of the display device DD. For example, the control module 10 activates or deactivates the display panel DP and the touch sensing member. The control module 10 may control the display panel DP, the image input module 30, the audio input module 40, the audio output module 50, and/or the like, based on a touch signal received from the touch sensing member TS.

The wireless communication module 20 may transmit/receive a wireless signal with another terminal by utilizing a Bluetooth and/or Wi-Fi line. The wireless communication module 20 may transmit/receive an audio signal by utilizing a general communication line. The wireless communication module 20 includes a transmitting member 22 which modulates the signal that is to be transmitted and a receiving member 24 which demodulates the signal that is received.

The image input module 30 processes an image signal and converts the image signal to image data that can be input to the display panel DP. The audio input module 40, in a recording mode, a voice recognition mode, and/or the like, receives input from an external audio signal through a microphone and converts the audio signal to electrical audio data. The audio output module 50 converts and outputs to the outside the audio data that is received from the wireless communication module 20 and/or stored in the memory 60.

Figure 4:
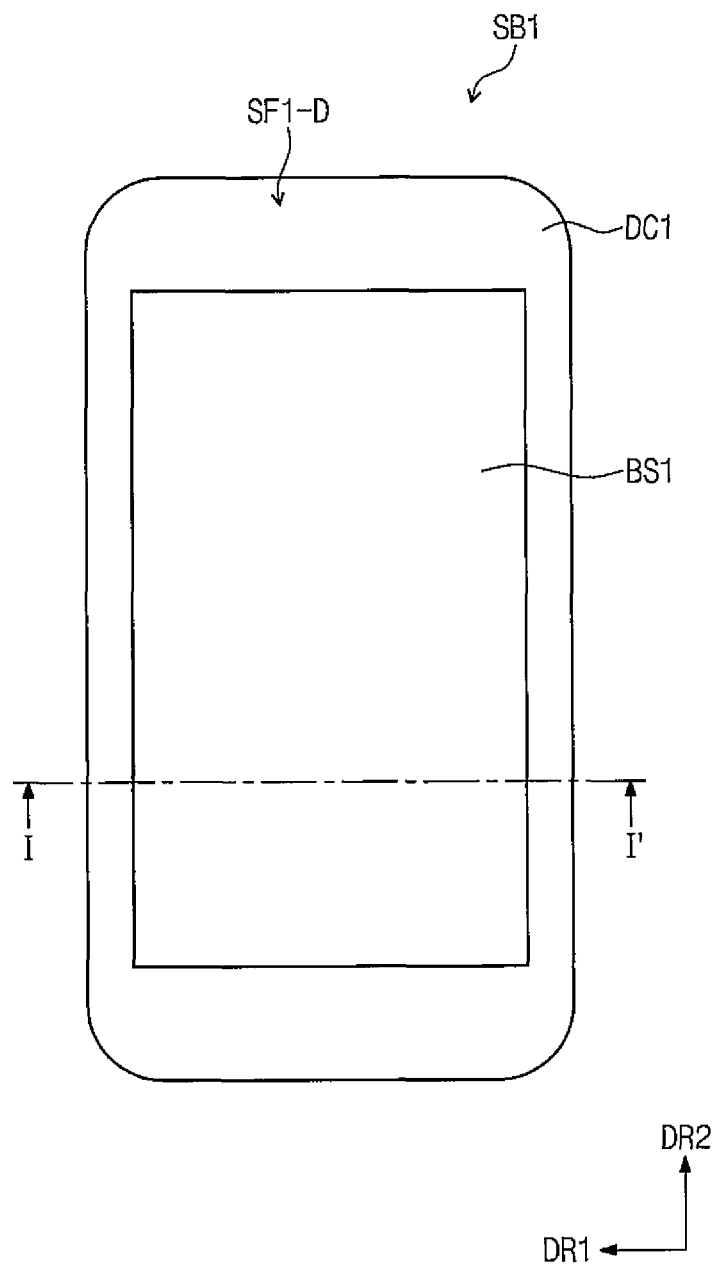
FIG. 4 is a plan view of the first member illustrated in FIG. 2.
Figure 5:
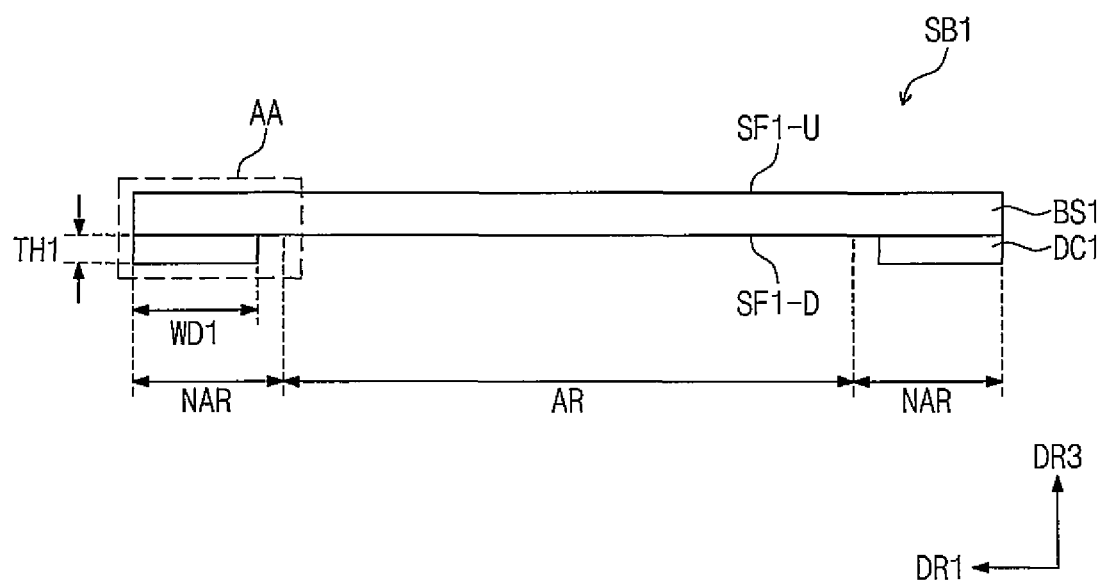
FIG. 5 is a cross-sectional view taken along the line I-I of the first member in FIG. 4.
Figure 6:
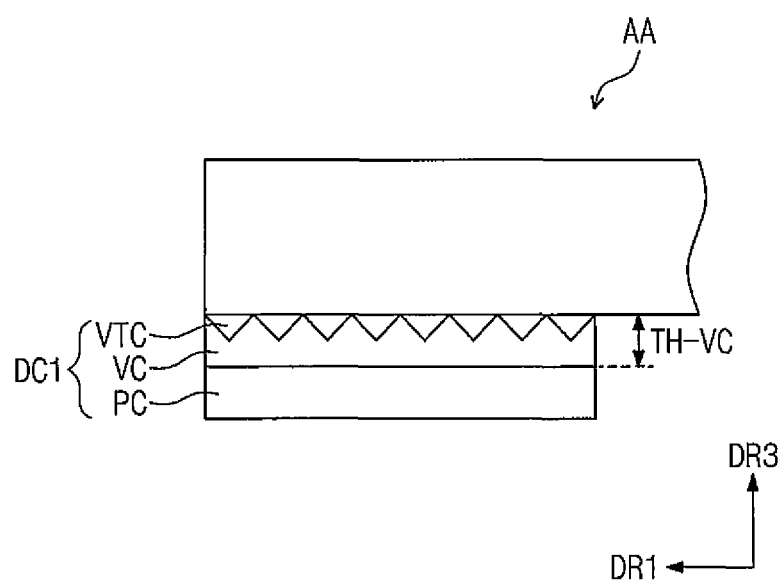
FIG. 6 illustrates an expanded view of the portion AA in FIG. 5.

FIG. 4 is a plan view of the first member SB1 illustrated in FIG. 2. FIG. 5 is a cross-sectional view taken along the line I-I of the first member SB1 in FIG. 4. FIG. 6 illustrates an expanded view of the portion AA in FIG. 5.

The first member SB1 includes a first base member BS1 and a first decoration member DC1.

The first base member BS1 may be a plastic film made of a synthetic resin as the raw material. For example, the first base member BS1 may include polyvinylidene chloride (PVDC), polyethylene terephthalate (PET), nylon, polypropylene (PP), and/or polyethylene (PE).

The thickness of the first base member BS1 may be about 25 µm to about 100 µm. When the thickness of the base member BS1 is less than about 25 µm, the thickness is thin (e.g., excessively thin), and thus the first base member BS1 may be difficult to handle during a process of being laminated to another element. When the thickness of the first base member BS1 is greater than about 100 µm, the thickness is thick (e.g., excessively thick), and thus may influence the transparency, and/or the like, of the first base member BS1.

The first base member BS1 may be manufactured through an inflation method, a T-die method, and/or a casting method.

The first decoration member DC1 is disposed on a portion of the first base member BS1 that corresponds to the light blocking area NAR and is part of the first bottom surface SF1-D. The first decoration member DC1 is disposed, within the light blocking area NAR, on an end portion (e.g., on the edge portion) of the first bottom surface SF1-D.

The width (hereinafter, a first width) WD1 of the first decoration member DC1 may be about 2 mm to about 4 mm. The first width WD1 is smaller than the width of the light blocking area NAR. The thickness (hereinafter, a first thickness) TH1 of the first decoration member DC1 may be about 1 µm to about 15 µm. When the first thickness TH1 is less than about 1 µm, the first thickness is thin (e.g., excessively thin), and thus the durability may be decreased. When the first thickness TH1 is greater than about 15 µm, a large amount of material is needed to form the first decoration member DC1, and thus may be difficult to control in the manufacturing process. The first thickness TH1 may change according to the color of the first decoration member DC1.

Referring to FIG. 6, the first decoration member DC1 may include an optical pattern layer VTC, a deposition layer VC, and an ink layer PC. The optical pattern layer VTC may be disposed directly on the first bottom surface SF1-D of the first base member BS1. The deposition layer VC may be disposed directly on a surface of the optical pattern layer VTC. The ink layer PC may be disposed directly on a surface of the deposition layer VC.

The optical pattern layer VTC may include a lenticular pattern. A cross section of the lenticular pattern may be in the shape of sequentially disposed triangles. However, the cross section of the lenticular pattern is not limited thereto, and may be a convexly curved pattern.

The optical pattern layer VTC may be formed through a UV molding technique. In the UV molding technique, first, a pattern forming member is tightly disposed (e.g., disposed without air gaps) on a surface of the first base member BS1. The pattern forming member includes a pattern member that has a concave pattern and a lenticular forming material that is disposed to correspond to the concave pattern. After curing the lenticular forming material by emitting ultraviolet radiation on the surface of the first base member BS1 and the pattern forming member, the pattern member is removed. Through such a process, the optical pattern layer VTC having the lenticular pattern may be formed.

The deposition layer VC may contain an inorganic oxide and/or a metal. The deposition layer VC may be formed by depositing (e.g., attaching) vapor, which is generated by heating the inorganic oxide and/or metal to a high temperature, to the optical pattern layer VTC. The inorganic oxide may include titanium dioxide ($TiO_2$) and/or silicon dioxide ($SiO_2$). The metal may include indium (In).

The color of the first decoration member DC1 may change according to the thickness (hereinafter, deposition layer thickness) TH-VC of the deposition layer VC. For example, the brightness of the first decoration member DC1 may decrease as the deposition layer thickness TH-VC increases.

The ink layer PC may include a pigment and/or a dye. The pigment is a colorant that expresses color in a material, and is a finely powdered solid that does not dissolve in water, oil, and/or the like. The pigment is divided (e.g., classified) into an inorganic pigment and an organic pigment. The inorganic pigment is characterized by being stable and not changing in color under heat or sunlight. The organic pigment has a sharp color and a variety of types. The dye is a colorant that dissolves in water, and is a colored material that permeates fiber or paper and bonds with the molecules of the fiber, and/or the like, to thereby color the fiber. The color of the ink layer PC may be, for example, black or white.

Figure 7:
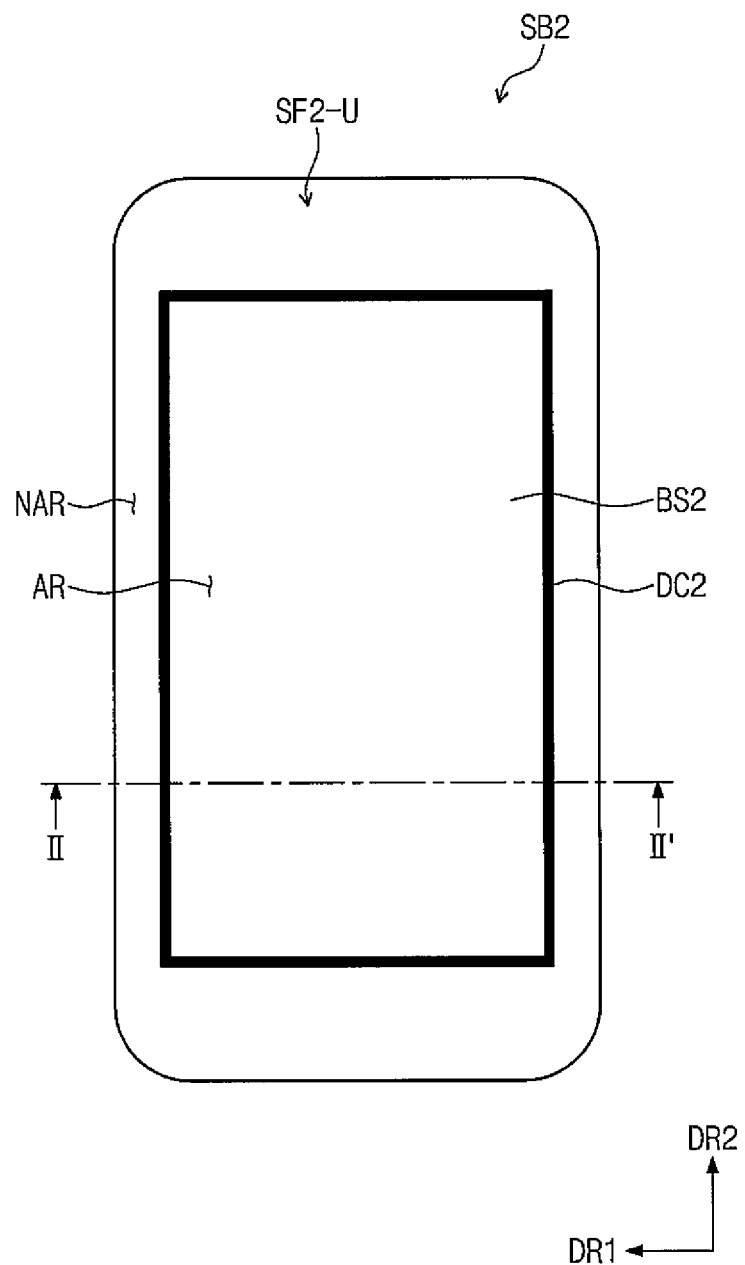
FIG. 7 is a plan view of the second member illustrated in FIG. 2.
Figure 8:
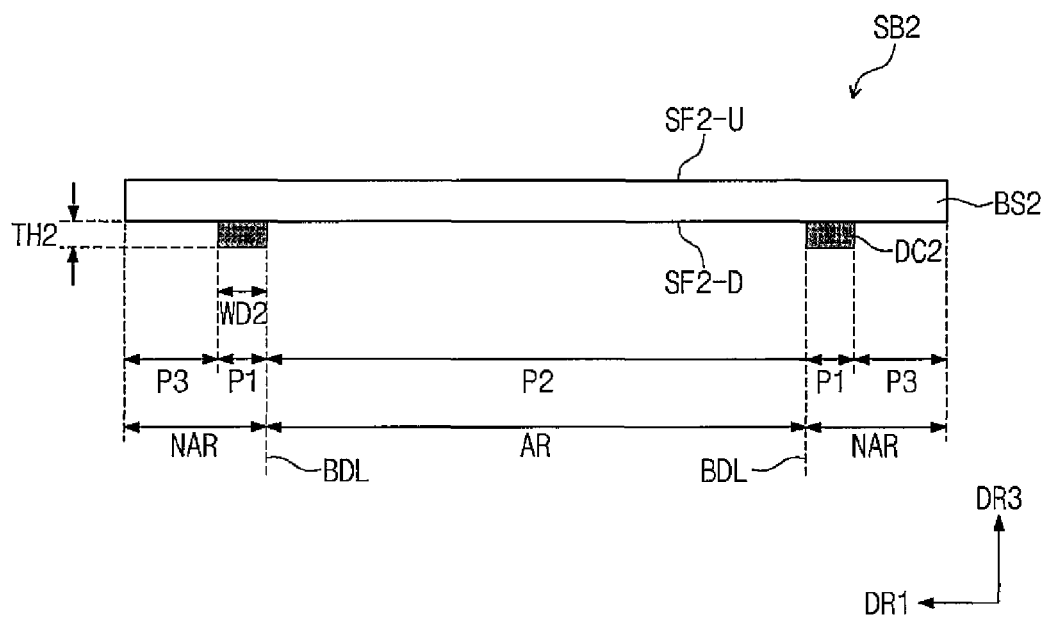
FIG. 8 is a cross-sectional view taken along the line II-II' of the second member in FIG. 7.

FIG. 7 is a plan view of the second member SB2 illustrated in FIG. 2. FIG. 8 is a cross-sectional view taken along the line II-II' of the second member SB2 in FIG. 7.

The second member SB2 includes a second base member BS2 and a second decoration member DC2.

The second decoration member DC2 is disposed on a portion of the second base member BS2 that corresponds to the light blocking area NAR and is part of the second bottom surface SF2-D. The second decoration member DC2 defines a boundary line BDL between the transmission area AR and the light blocking area NAR. That is, the second decoration member DC2 separates (e.g., divides) the transmission area AR from the light blocking area NAR.

The width (hereinafter, a second width) WD2 of the second decoration member DC2 may be about 0.1 mm to about 0.6 mm. When the second width WD2 is less than about 0.1 mm, the second decoration member DC2 may not contribute (e.g., substantially contribute) to reducing the tolerance for errors (e.g., reducing errors) which may occur in the manufacturing process of the window member WM. When the second width WD2 is greater than about 0.6 mm, the second decoration member DC2 may be excessively noticeable by the user of the display device DD such that the aesthetic function is degraded.

The thickness (hereinafter, a second thickness) TH2 of the second decoration member DC2 may be about 1 µm to about 6 µm. When the second thickness TH2 is less than about 1 µm, the second thickness TH2 is thin (e.g., excessively thin), and thus the durability may be decreased. When the second thickness TH2 is greater than about 6 µm, a large amount of material is needed to form the first decoration member DC2, and thus may be difficult to control in the manufacturing process.

The second member BS2 may be a transparent member and include a glass substrate and/or a plastic substrate. Moreover, the second member BS2 may include a tempered glass substrate and/or a reinforced plastic substrate. Furthermore or alternatively, the second base member BS2 may include a flexible plastic substrate. The second base member BS2 may also have a multi-layered structure in which multiple layers are laminated.

The second base member BS2 includes a first area P1, a second area P2, and a third area P3. The first area P1 is an area which corresponds to a portion of the light blocking area NAR, and on which the second decoration member DC2 is disposed. The second area P2 is an area adjacent to the first area P1 and corresponding to the transmission area AR. The third area P3 is an area adjacent to the first area P1 and corresponding to the remaining portion, which does not correspond to the first area P1, of the light blocking area NAR.

Thus, in the third direction DR3, the first area P1 and third area P3 of the second base member BS2 overlap the light blocking area NAR, and the second area P2 of the second base member BS2 overlaps the transmission area AR.

Figure 9:
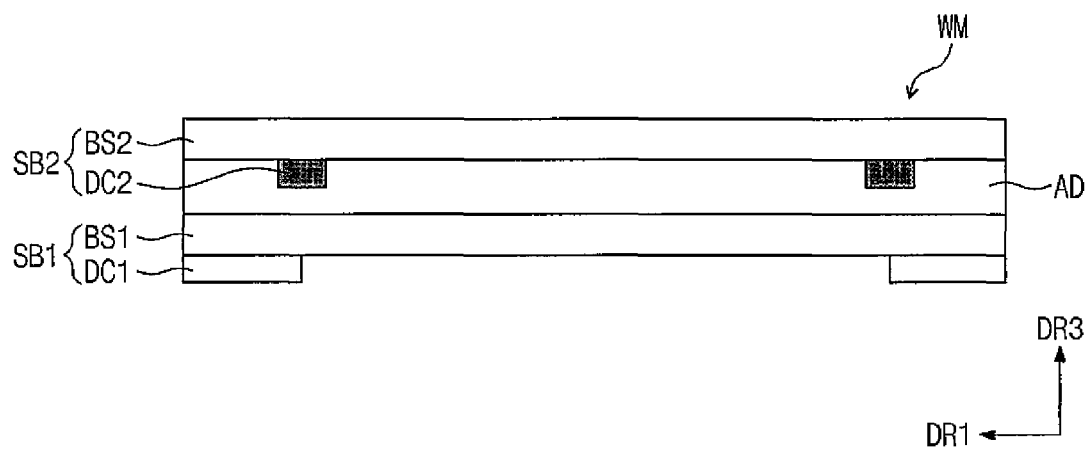
FIG. 9 is a cross-sectional view illustrating a state in which the first member in FIG. 5 and the second member in FIG. 8 are coupled by an adhesive member.

FIG. 9 is a cross-sectional view illustrating a state in which the first member SB1 in FIG. 5 and the second member SB2 in FIG. 8 are coupled by an adhesive member AD.

The adhesive member AD couples the first member SB1 and the second member SB2. The adhesive member AD may be an optical clear adhesive OCA.

As illustrated in FIG. 9, the light blocking area NAR is defined by the first decoration member DC1 and the second decoration member DC2.

Referring to FIG. 9, the first decoration member DC1 includes the optical pattern layer VTC that has a lenticular pattern. It is difficult for a fine pattern, such as the lenticular pattern, to be disposed directly on tempered glass or reinforced plastic. Conversely, the fine pattern may be easily disposed on the first base member BS1, which is a plastic film such as polyethylene terephthalate (PET).

The second decoration member DC2 may be printed directly on the second base member BS2, and thus may precisely define the boundary line BDL between the transmission area AR and the light blocking area NAR.

Therefore, in the window member WM having the structure such as that in FIG. 9, the second decoration member DC2 may be utilized to reduce the tolerance for the error (e.g., reduce error) which may consequently occur in the manufacturing process when defining the boundary line BDL, and the first decoration member DC1 may be utilized to provide the various colors generated by the lenticular pattern, and/or the like.

Figure 10:
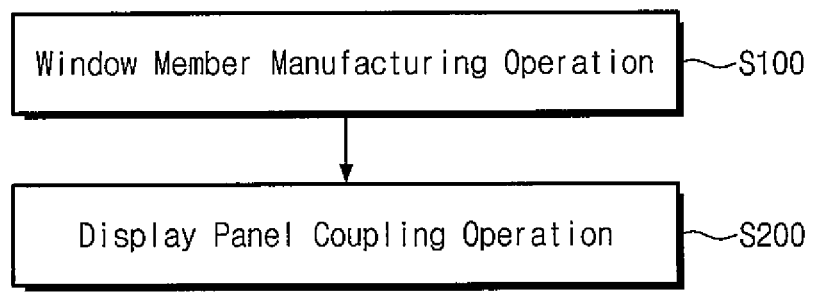
FIG. 10 is a flowchart illustrating a method of assembling the window member and display panel illustrated in FIG. 2.
Figure 11:
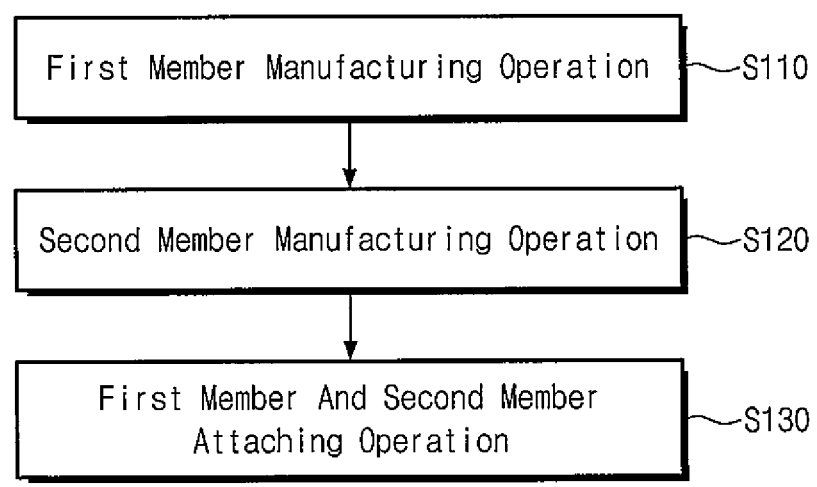
FIG. 11 is a flowchart illustrating the window member manufacturing operation in FIG. 10.
Figure 12:
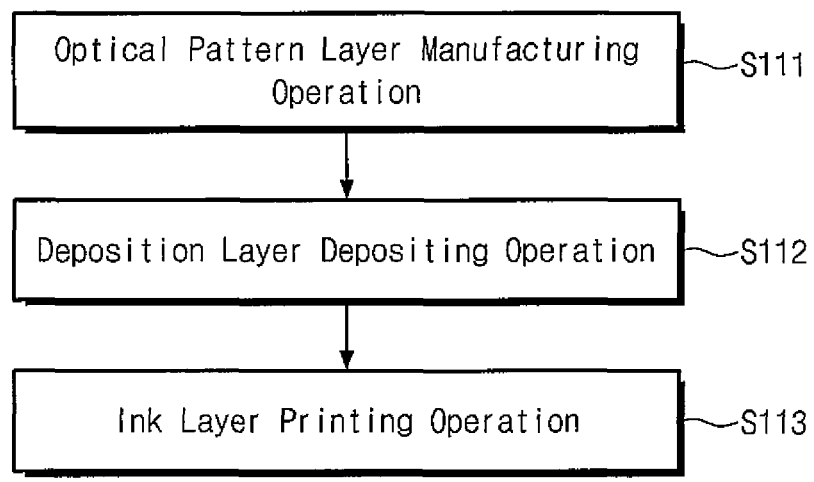
FIG. 12 is a flowchart illustrating the first member manufacturing operation in FIG. 11.
Figure 13:
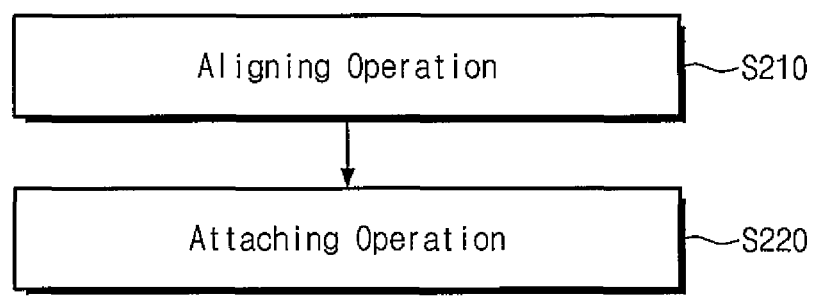
FIG. 13 is a flowchart illustrating the display panel coupling operation in FIG. 10.

FIG. 10 is a flowchart illustrating a method of assembling the window member WM and display panel DP illustrated in FIG. 2. FIG. 11 is a flowchart illustrating the window member manufacturing operation S100 in FIG. 10. FIG. 12 is a flowchart illustrating the first member manufacturing operation S110 in FIG. 11. FIG. 13 is a flowchart illustrating the display panel coupling operation S200 in FIG. 10.

Referring to FIGS. 2 and 10, the method of manufacturing the display device DD includes the window member manufacturing operation S100 and the display panel coupling operation S200. In the window member manufacturing operation S100, the window member WM which includes the transmission area AR and the light blocking area NAR adjacent to the transmission area AR is manufactured. In the display panel coupling operation S200, the display panel DP and the window WM are coupled.

Referring to FIG. 11, the window member manufacturing operation S100 includes a first member manufacturing operation S110, a second member manufacturing operation S120, and a first member and second member attaching operation S130.

The first member manufacturing operation S110 refers to (e.g., indicates) a method for manufacturing the first member SB1, and includes an optical pattern layer manufacturing operation S111, a deposition layer depositing operation S112, and an ink layer printing operation S113. These processes are illustrated in FIGS. 4 to 6. The second member manufacturing operation S120 refers to (e.g., indicates) a method for manufacturing the second member SB2, which is illustrated in FIGS. 7 and 8. The first member and second member attaching operation S130 refers to a method for coupling the first member SB1 and the second member SB2, which is illustrated in FIG. 9.

Referring to FIG. 13, the display panel coupling operation S200 includes an aligning operation S210 and an attaching operation S220. In the aligning operation S210, the display panel DP and the window member WM are aligned with respect to the second decoration member DC2. Thus, the second decoration member DC2 performs the function of an alignment marking, which aligns the display panel DP and the window member WM.

The second decoration member DC2 has a narrow tolerance for error (e.g., the second decoration member DC2 is formed precisely and accurately), and thus may adequately perform the alignment marking function which aligns the display panel DP and the window member WM.

In the attaching operation S220, the display panel DP and the window member WM are coupled by the optical clear adhesive OCA.

As described above, a window member according to an embodiment of the inventive concept may reduce the tolerance for error which occurs in a process of defining a boundary line between a transmission area and a light blocking area.

Moreover, according to a display device which is in accordance with an embodiment of the inventive concept, and a method of manufacturing the display device, the tolerance for error may be reduced and the display panel may be precisely and accurately aligned with the window member.

Although the exemplary embodiments of the present invention have been described, it is understood that the scope of the present invention should not be limited to these exemplary embodiments but various changes and modifications can be made by one ordinary skilled in the art within the spirit and scope of the present invention as hereinafter claimed, and equivalents thereof. Moreover, the embodiments disclosed herein are not intended to be limiting of the technical concept of the present invention. Rather, the scope of the following claims and all technical concepts within the equivalent scope should be considered as being included within the scope of the present invention.

What is claimed is:

1. A window member having a transmission area and a light blocking area adjacent to the transmission area, the window member comprising:
    a first member comprising a first base member having a top surface and a bottom surface facing away from the top surface, and a first decoration member on a portion of the bottom surface of the first base member; and
    a second member on the top surface of the first base member, the second member comprising a second base member having a top surface and a bottom surface facing away from the top surface, and a second decoration member on a portion of the bottom surface of the second base member, the second decoration member being configured to define a boundary line between the transmission area and the light blocking area,
    wherein the second base member comprises:
    a first area corresponding to a portion of the light blocking area, and on which the second decoration member is disposed;
    a second area adjacent to the first area and corresponding to the transmission area; and
    a third area adjacent to the first area and corresponding to a remaining portion of the light blocking area,
    wherein the first decoration member overlaps with the third area and partially overlaps with the first area.

2. The window member of claim 1, wherein the first base member is a plastic film.

3. The window member of claim 2, wherein the first decoration member comprises:
    an optical pattern layer on the first base member and having a lenticular pattern;
    a deposition layer on the optical pattern layer and comprising an inorganic oxide and/or a metal; and
    an ink layer on the deposition layer.

4. The window member of claim 3, wherein the inorganic oxide comprises titanium dioxide ($TiO_2$) and/or silicon dioxide ($SiO_2$).

5. The window member of claim 3, wherein the metal comprises indium (In).

6. The window member of claim 3, wherein a color of the ink layer is black or white.

7. The window member of claim 1, wherein the second base member is a tempered glass or a reinforced plastic.

8. The window member of claim 7, wherein the second decoration member comprises a pigment and/or a dye.

9. The window member of claim 7, wherein a width of the second decoration member is about 0.1 mm to about 0.6 mm, and a thickness of the second decoration member is about 1 μm to about 6 μm.

10. The window member of claim 1, further comprising an adhesive member between the first member and the second member, wherein the first member and the second member are coupled by the adhesive member.

11. A display device comprising:
    a display panel for displaying an image; and a window member having a transmission area for transmitting the image and a light blocking area adjacent to the transmission area for blocking the image, wherein the window member comprises:

a first member comprising a first base member having a top surface and a bottom surface facing away from the top surface, and a first decoration member on a portion of the bottom surface of the first base member, and a second member on the top surface of the first base member, and comprising a second base member having a top surface and a bottom surface facing away from the top surface, and a second decoration member on a portion of the bottom surface of the second base member and configured to define a boundary line between the transmission area and the light blocking area, wherein the second base member comprises:

a first area corresponding to a portion of the light blocking area, and on which the second decoration member is disposed;

a second area adjacent to the first area and corresponding to the transmission area; and a third area adjacent to the first area and corresponding to a remaining portion of the light blocking area, wherein the first decoration member overlaps with the third area and partially overlaps with the first area.

12. The display device of claim 11, wherein the first base member is a plastic film.

13. The display device of claim 12, wherein the first decoration member comprises:

an optical pattern layer on the first base member and having a lenticular pattern;

a deposition layer on the optical pattern layer and comprising an inorganic oxide and/or a metal; and an ink layer on the deposition layer.

14. The display device of claim 13, wherein the inorganic oxide comprises titanium dioxide ($TiO_2$) and/or silicon dioxide ($SiO_2$).

15. The display device of claim 13, wherein the metal comprises indium (In).

16. The display device of claim 11, further comprising a touch sensing member between the display panel and the window member.

17. The display device of claim 16, further comprising a protective member coupled to the window member, wherein the protective member is configured to accommodate the display panel and the touch sensing member.

18. A method of manufacturing a display device, the method comprising:

manufacturing a window member having a transmission area and a light blocking area adjacent to the transmission area; and coupling a display panel to the window member, wherein the manufacturing of the window member comprises:

manufacturing a first member by disposing a first decoration member on a portion of a first base member corresponding to the light blocking area, the first base member being a plastic film;

manufacturing a second member by disposing a second decoration member on a portion of a second base member configured to define a boundary line between the transmission area and the light blocking area, the second base member being a tempered glass or a reinforced plastic; and coupling the first member and the second member utilizing an adhesive member such that the first decoration member and the second decoration member partially overlap.

19. The method of claim 18, wherein the manufacturing of the first member comprises:

disposing an optical pattern layer having a lenticular pattern on the first base member;

disposing a deposition layer comprising an inorganic oxide and/or a metal on the optical pattern layer; and disposing an ink layer on the deposition layer.

20. The method of claim 18, wherein the coupling of the display panel comprises aligning the display panel and the window member with respect to the second decoration member.

* * * * *